United States Patent [19]

Sternin et al.

[11] Patent Number: 4,934,272
[45] Date of Patent: Jun. 19, 1990

[54] SMOKE GENERATING CARTRIDGE FOR OVENS AND BARBECUES AND MEANS FOR HOLDING SAME

[75] Inventors: Vulf Sternin, Vancouver; Hiromi Hori, Richmond, both of Canada

[73] Assignee: Keystone Materials Partnership Limited, Canada

[21] Appl. No.: 232,912

[22] Filed: Aug. 16, 1988

Related U.S. Application Data

[63] Continuation-in-part of Ser. No. 104,409, Oct. 5, 1987, abandoned.

[51] Int. Cl.$^5$ .............................................. F42B 13/44
[52] U.S. Cl. ..................... 102/334; 44/590; 99/482
[58] Field of Search ................... 102/334; 99/467, 474, 99/482; 44/590

[56] References Cited

U.S. PATENT DOCUMENTS

| | | | |
|---|---|---|---|
| 2,789,877 | 4/1957 | Pfundt | 99/482 X |
| 3,347,148 | 10/1967 | Williams | 99/482 X |
| 3,693,534 | 9/1972 | Martin | 99/482 X |
| 3,788,301 | 1/1974 | Terry | 99/482 X |
| 3,880,611 | 4/1975 | Weiss | 44/590 X |
| 4,046,518 | 9/1977 | Dalzell | 44/590 X |
| 4,102,653 | 7/1978 | Simmons et al. | 44/590 X |
| 4,201,125 | 5/1980 | Ellis | 99/482 X |
| 4,326,854 | 4/1982 | Tanner | 44/590 X |
| 4,436,100 | 3/1984 | Green, Jr. | 99/482 X |
| 4,612,017 | 9/1986 | Lindell | 44/590 X |
| 4,704,957 | 11/1987 | Kerres | 99/482 X |

FOREIGN PATENT DOCUMENTS

| | | | |
|---|---|---|---|
| 145640 | 12/1980 | German Democratic Rep. | 431/126 |
| 1242094 | 1/1985 | U.S.S.R. | 99/482 |
| 2032096 | 4/1980 | United Kingdom | 431/126 |

*Primary Examiner*—Peter A. Nelson
*Attorney, Agent, or Firm*—Burns, Doane, Swecker & Mathis

[57] ABSTRACT

A smoke generating cartridge for use in barbecues or other food cooking or smoking enclosures is disclosed. The cartridge comprises a tightly packed cylinder of wood particles wrapped in paper such that a self-sustaining smoldering combustion is provided when the cartridge is ignited. The invention further discloses a holder for mounting the cartridge to provide the smoke to a barbecue enclosure.

15 Claims, 1 Drawing Sheet

U.S. Patent　　　　Jun. 19, 1990　　　　4,934,272
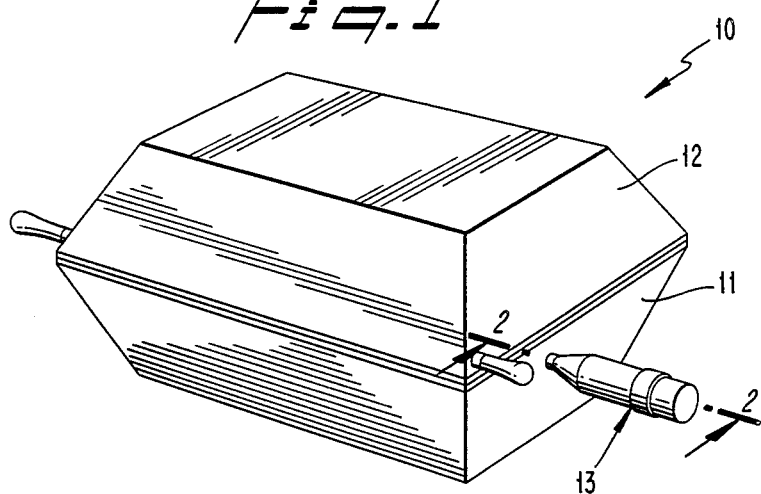
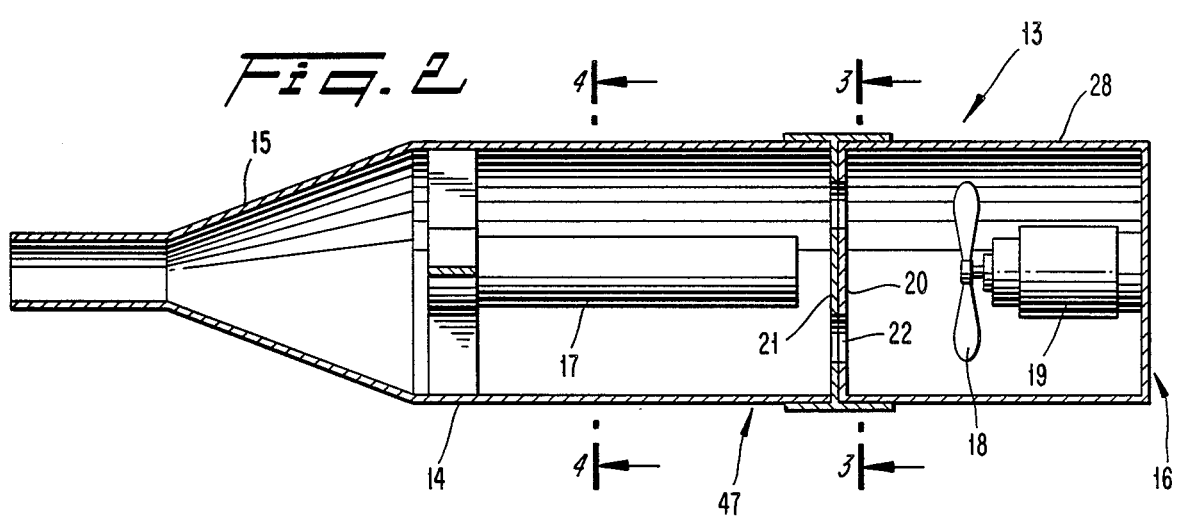
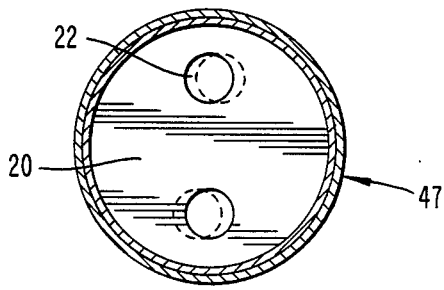
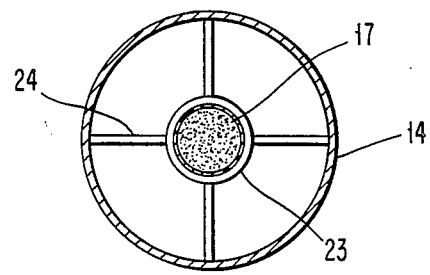
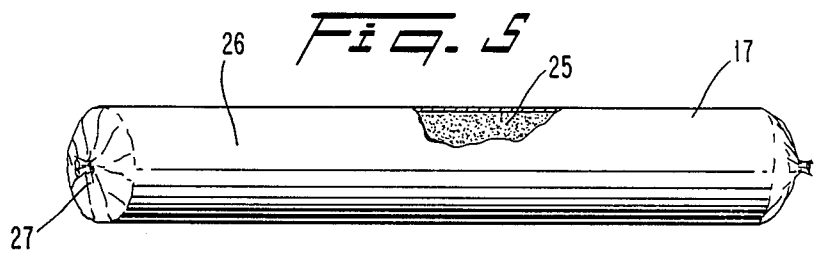

SMOKE GENERATING CARTRIDGE FOR OVENS AND BARBECUES AND MEANS FOR HOLDING SAME

This is a continuation-in-part of application No. 104,409 filed Oct. 5, 1987, and now abandoned.

FIELD OF THE INVENTION

This invention relates to a smoke producing apparatus for barbecues and more particularly to a smoke generating cartridge and a holder for use therewith.

DESCRIPTION OF THE PRIOR ART

The addition of flavor to barbecue cooking by means of wood smoke can enhance the taste of various foods such as beef, poultry, fish and ham, and vegetables. For example, the use of hickory chips in a barbecue will impart to the food a pleasant hickory flavor. The improved convenience of barbecue cooking due to the use of propane-fueled barbecues as well as increased use of traditional barbecues has created an interest in the use of wood smoke flavoring in such barbecues.

In the past, when wood chips have been used to add flavor to barbecued meat, the wood chips have been placed directly on the barbecue coals, or in a non-flammable container or wrapping such as a metal can or aluminum foil. When the chips ignite into flame, little smoke is generated, so it has generally been necessary to moisten the chips with water before use in order to suppress any flaming. This procedure is relatively inconvenient and it is difficult for the user to control the amount of smoke produced as the chips eventually dry out and ignite into flame, or the smoldering stops completely. Indeed, little or no smoke may be produced as the water will first steam, and the chips will ignite into flame shortly after drying out or the combined temperature and moisture content will cause the smoldering to stop completely.

One apparatus devised to produce a controlled supply of smoke is shown in U.S. Pat. No. 3,788,301 issued Jan. 29, 1974 to Terry. The Terry apparatus is quite involved in that it requires coal fuel to generate the heat to cause the chips to smolder. The construction of the device is also relatively involved, requiring a number of parts with vents or grating and a duct for connecting the device to the food enclosure.

U.S. Pat. No. 3,347,148 issued Oct. 17, 1967 to Williams discloses a simpler smoke generating device. In this case, the wood chips are held in a cylindrical wire screen enclosure. The wire screen enclosure acts as a flame arrester and container for the chips. There is apparently no provision in the device for refilling the wire screen container and so the empty metal enclosure apparently is discarded after one use, adding to the expense of this device.

U.S. Pat. No. 4,095,957 issued June 20, 1978 to Orsing discloses a product for cooking or smoking food in which the fuel is vacuum-sealed in a non-flammable tube of non-woven glass fiber fabric. A combustible fluid such as lighter fluid is also encased in the tube with the fuel and the casing is peeled away to expose the fuel for combustion. This device is apparently designed to ignite the fuel rather than allowing it to smolder.

A problem with a number of existing approaches to smoke generation is that the devices depend on the barbecue as a source of heat for smoldering The distribution of heat in a barbecue is very uneven, however. Due to the difficulty in controlling the amount of heat which is supplied to the smoking apparatus, these approaches are not reliable in providing a steady supply of smoke. For the reasons noted above the smoldering time of the chips may be short or non-existent as the chips dry out and ignite into flame.

There is therefore a need for an inexpensive, reliable and convenient smoke-producing cartridge which produces a constant supply of smoke without flaming and which may operate independently of the oven or barbecue.

Accordingly an object of the present invention is to provide a smoke generating single use cartridge which is easy to use, which can be ignited without being placed on hot coals, and which when ignited produces a smoldering, self-sustaining combustion.

Another object of the invention is to provide a smoke generating apparatus which can be installed on the exterior of a standard barbecue or any food-smoking enclosure and wherein the generation of smoke is not affected by the operation of the barbecue.

SUMMARY OF THE INVENTION

The present invention therefore provides a smoke generating cartridge comprising an elongated body formed of wood particles which have been sized and packed to a predetermined density to support a smoldering combustion, and a wrapping having self-sustaining combustible properties enclosing the packed particles.

According to a second aspect of the invention, there is also provided an apparatus for holding the smoke generating cartridge which comprises a housing for holding the cartridge centrally thereof and having an air inlet and an air outlet. The apparatus may also include means for generating air pressure therein such that smoke generated by said cartridge when ignited will generally exit at said air outlet, and means for regulating the flow of air therethrough.

BRIEF DESCRIPTION OF THE DRAWINGS

Particular embodiments of the invention will be understood in conjunction with the accompanying drawings in which:

FIG. 1 is an illustrative view of a standard barbecue using a cartridge holder according to an embodiment of the invention;

FIG. 2 is a sectional view taken along lines 2—2 of FIG. 1;

FIG. 3 is a sectional view taken along lines 3—3 of FIG. 2;

FIG. 4 is a sectional view taken along lines 4—4 of FIG. 2; and

FIG. 5 is a partially sectioned side view of a smoking cartridge according to an embodiment of the invention.

DETAILED DESCRIPTION OF A PREFERRED EMBODIMENT

Referring to FIG. 1, a typical portable barbecue, designated by numeral 10, has a base 11 and a lid 12 which can be opened by handles 8. The smoke generating cartridge holder 13 is shown inserted into a ventilation hole (not shown) in base 11.

Referring to FIG. 5, the smoke generating cartridge of the invention is designated by numeral 17. The cartridge consists of an elongated body of sawdust particles which have been sized and packed to a predetermined density. The particles are enclosed or wrapped in a material 26 having self-sustaining combustible properties, such as rice paper. The wrapping also provides mechanical strength for the cartridge during handling and transportation. The completed cartridge when ignited has a smoldering, self-sustaining combustion. To assist in lighting the cartridge, one or both ends 27 of the cartridge are soaked in a wax solution.

Cartridge 17 is designed to produce smoke independently of the heat of the barbecue. The cartridge may be placed inside the barbecue enclosure along with the food to be smoked prior to starting the barbecue, and lit to produce smoke for contact with the meat prior to or during cooking Alternatively a holder of the sort described in further detail below may be used to provide smoke from the cartridge to the barbecue enclosure during cooking. In effect the cartridge burns much like a large cigar—slowly at a controlled rate, producing a large quantity of smoke and leaving only ash.

By way of example, the sawdust particles for the cartridge of the invention were made by grinding the irregular hickory shavings from a lathe in a coffee grinder for twenty to twenty-five minutes. The sizing of the particles thus produced was such that 97 per cent would pass through a number 10 sieve (2 mm. openings), 47 per cent through a number 20 sieve (850 micron openings) and about 5 per cent through a number 40 sieve (425 micron openings). The sawdust thus produced was wrapped in rice paper of 0.1 mm. thickness as follows. A tube was formed of the rice paper and the tube inserted into a one-inch diameter pipe. Layers of the sawdust were poured into the lined pipe, 2 centimeters at time, and the layers were tamped down using a two to four kilogram weight allowed to fall freely into the pipe. Once the desired length is reached (about 4 to 6 inches), the tube is removed from the pipe. After the tube is removed from the pipe, the ends are twisted or folded to retain the particles. The ends may then be dipped in wax to facilitate lighting. This method has been found to produce a proper density of the wood particles which allows a self-sustaining smoldering combustion without flaming.

While the preferred embodiment uses the rice paper as a retainer for the sawdust particles and also as a regulator for the combustion, other papers may be suitable, or a binder for the particules may be used such as a flour and water mixture. Since the presence of absence of the paper wrapping and the type of paper wrapping will affect the flow of air to the particles and also the amount of heat generated, the tightness of the packing and size of the sawdust particles will vary accordingly. Also other particulate fuels may be used instead of sawdust, such as tea. Also the wrapping material or the sawdust may be impregnated with additional flavor-producing agents such as garlic, onion, juniper or alder leaves.

Referring now to FIG. 2 we have shown a sectional view of the smoke generating apparatus according to an embodiment of the present invention. The smoke generating apparatus is comprised of a housing 14 having a generally elongated cylindrical body with a funnel shaped air outlet 15 and an air inlet 16.

Housing 14 is adapted to receive centrally therein a smoke producing cartridge 17 according to a further embodiment of the present invention. The smoke generating apparatus 13 is provided with an air regulator 47 adapted to regulate the amount of air flowing into housing 14. A motorized fan 18 is located proximate to air inlet 16. Fan 18 is controlled by means of a small electric motor 19 powered by suitable power source (not shown). The motorized fan generates an air pressure within the smoke generating apparatus such that smoke created by cartridge 17 will generally exit funnel shaped outlet 15.

Referring now to FIG. 3, we have shown a sectional view of the air regulator 47. Air regulator 47 is basically comprised of a pair of discs 20 and 21 lying adjacent to each other and held onto housing 14 by flanges 48. Each disc is provided with a pair of apertures 22 adapted to be rotated relative to each other. Rotation of each disc relative to each other, allows a variation in the amount of air being allowed through housing 14 of the smoke generating apparatus 13.

Referring now to FIG. 4, we have shown a sectional view of housing 14 showing the means by which cartridge 17 is held centrally within housing 14. A ring 23 is centrally located within housing 14 and centrally located therein by means of a series of cross members 24. The location of smoke producing cartridge 17 can be critical in that proper combustion of the cartridge can be achieved by allowing air to flow around the cartridge. Other means of holding the cartridge in the housing which allow free flow of air around the cartridge would also work.

The cartridge 17 is inserted into ring 23 so that one end is supported therein, with the majority of the cartridge extending out from the ring along the central axis of the housing.

In use, housing 28 and air regulator 47 are removed, exposing the interior of housing 14. A fresh cartridge 17 is installed in ring 23 and the cartridge is lit. Air inlet 16 and regulator 47 are replaced, fan 19 is activated and funnel 15 is inserted into a ventilation hole of the barbecue. Some smoke generation will also be provided without the use of a fan.

As can be seen from the above, smoke can be introduced into the barbecue without the cartridge being affected by the operation of the barbecue. For example, the interior of the barbecue can be smoked prior to ignition of the coals. This is preferable to the prior art process in that most of the flavor of the smoke enters the food at the start of cooking When the meat, for example, is cool and dry, it will absorb a greater amount of the smoke flavor than when it is expelling juices while cooking.

Once the combustion of cartridge 17 is complete, the ashes can be removed from housing 14 by removing the outer end 28 and the air regulating unit 17.

Various adaptations and modifications of the structure described above are possible without departing from the spirit of the invention, the scope of which is to be construed in accordance with the accompanying claims.

We claim:

1. A smoke generating cartridge comprising an elongated body of densely packed particulate combustible material and means for binding said particulate material into a stable, transportable unit, said particulate material includes discrete particles having a size range from about 0.4 mm to about 2 mm, said binding means, the size range and a predetermined density of packing said particulate material being selected to provide a cartridge whereby said cartridge smolders in the absence of flame, and is incapable of self-sustaining, unaided, flamed combustion once the cartridge is ignited.

2. The smoke generating cartridge of claim 1 wherein said particulate material comprises wood particles.

3. The smoke generating cartridge of claim 2 wherein said binding means comprises a combustible paper wrapping.

4. The smoke generating cartridge of claim 3 wherein said paper is rice paper.

5. The smoke generating cartridge of claim 4 wherein said rice paper is between 0.05 mm. and 0.2 mm. in thickness.

6. The smoke generating cartridge of claim 3 wherein a portion of said paper wrapping is provided at one end thereof with a wax coating.

7. The smoke generating cartridge of claim 1 wherein said binding means comprises a flour and water solution added to said particulate material.

8. A device for providing smoke to an enclosure comprising:

(a) a smoke generating cartridge having an elongated body of densely packed particulate combustible material and means for binding said particulate material into a stable, transportable unit having a predetermined size range from about 0.4 mm to about 2 mm, said binding means, the size range and a predetermined density of packing said particulate material being selected to provide a cartridge whereby said cartridge smolders in the absence of flame, and is incapable of self-sustaining, unaided, flamed combustion once the cartridge is ignited; and (b) a housing for holding said cartridge, said housing having an air inlet and an air outlet.

9. The device of claim 8 wherein said pressure generating means comprises a motorized fan adapted to generate a positive air flow through said damper.

10. The device of claim 8 further comprising means for generating air pressure in said housing such that smoke generated by said cartridge when ignited will generally exit at said air outlet.

11. The device of claim 10 wherein said housing comprises means for holding said cartridge centrally thereof.

12. The device of claim 11 wherein said housing has a funnel-shaped air outlet.

13. The device of claim 12 further comprising means for regulating the flow of air through said housing.

14. The device of claim 13 wherein said regulating means comprises a damper disposed between said cartridge and said pressure generating means.

15. The device of claim 13 wherein said damper comprises a pair of discs disposed adjacent to one another and rotatably mounted on a common axis, each disc having at least one aperture adapted to be aligned with a corresponding aperture on the other disc.

* * * * *